US011176415B2

(12) United States Patent
Irshad et al.

(10) Patent No.: US 11,176,415 B2
(45) Date of Patent: Nov. 16, 2021

(54) ASSISTED IMAGE ANNOTATION

(71) Applicant: Figure Eight Technologies, Inc., San Francisco, CA (US)

(72) Inventors: Humayun Irshad, San Francisco, CA (US); Seyyedeh Qazale Mirsharif, San Francisco, CA (US); Kiran Vajapey, San Francisco, CA (US); Monchu Chen, San Francisco, CA (US); Caiqun Xiao, San Francisco, CA (US); Robert Munro, San Francisco, CA (US)

(73) Assignee: Figure Eight Technologies, Inc., San Francisco, CA (US)

( * ) Notice: Subject to any disclaimer, the term of this patent is extended or adjusted under 35 U.S.C. 154(b) by 14 days.

(21) Appl. No.: 16/406,802

(22) Filed: May 8, 2019

(65) Prior Publication Data

US 2019/0362186 A1 Nov. 28, 2019

Related U.S. Application Data

(60) Provisional application No. 62/669,264, filed on May 9, 2018, provisional application No. 62/835,288, filed on Apr. 17, 2019.

(51) Int. Cl.

| | |
|---|---|
| ***G06K 9/62*** | (2006.01) |
| ***G06K 9/20*** | (2006.01) |
| ***G06K 9/44*** | (2006.01) |
| ***G06N 20/00*** | (2019.01) |
| ***G06F 3/0482*** | (2013.01) |

(52) U.S. Cl.

CPC ......... *G06K 9/6254* (2013.01); *G06F 3/0482* (2013.01); *G06K 9/2063* (2013.01); *G06K 9/44* (2013.01); *G06K 9/6231* (2013.01); *G06N 20/00* (2019.01)

(58) Field of Classification Search

CPC ...... G08G 1/04; G08G 5/0082; G08G 1/0116; G08G 1/015; G08G 5/0026; G08G 1/0125; G06F 3/04845; G06F 3/0482; G06N 3/08; G06N 20/00; G06N 3/0454; G06N 20/10; G06N 20/20; G06K 9/00671; G06K 9/44;

(Continued)

(56) References Cited

U.S. PATENT DOCUMENTS

| | | | |
|---|---|---|---|
| 2010/0266175 | A1 | 10/2010 | Seung |
| 2013/0181976 | A1 | 7/2013 | Dastmalchi |

(Continued)

*Primary Examiner* — Brenda C Bernardi
(74) *Attorney, Agent, or Firm* — Van Pelt, Yi & James LLP

(57) ABSTRACT

Image annotation includes: accessing initial object prediction information associated with an image, wherein the initial object prediction information includes a plurality of initial predictions associated with a plurality of objects in the image, including bounding box information associated with the plurality of objects; presenting the image and at least a portion of the initial object prediction information to be displayed; receiving adjusted object prediction information pertaining to at least some of the plurality of objects, wherein the adjusted object prediction information is obtained from a user input made via a user interface configured for a user to make annotation adjustments to at least some of the initial object prediction information; and outputting updated object prediction information, wherein the updated object prediction information is based at least in part on the adjusted object prediction information.

17 Claims, 10 Drawing Sheets

400

Image Files: Http://Server/test_images

Requirements: Label cars, pedestrians; Label partial objects ...

ML Model: ○ CNN1 ● CNN2 ○ PCA ○ K-Means ...

Annotators:

| | ID | Accuracy |
|---|---|---|
| [X] | Alice | 95% |
| [X] | Bob | 97% |
| | ... | |

[X] Object Confidence Level Threshold: 80%

(58) Field of Classification Search
CPC .... G06K 9/6231; G06K 9/627; G06K 9/3241; G06K 9/2063; G06K 9/6254
See application file for complete search history.

(56) References Cited

U.S. PATENT DOCUMENTS

| | | | | |
|---|---|---|---|---|
| 2016/0103816 | A1 | 4/2016 | Grady | |
| 2016/0196659 | A1 * | 7/2016 | Vrcelj | G06T 7/12 382/154 |
| 2018/0121762 | A1 * | 5/2018 | Han | G06K 9/52 |
| 2019/0180083 | A1 * | 6/2019 | Gupta | G06K 9/00275 |
| 2019/0332893 | A1 * | 10/2019 | Roy Chowdhury | G06T 7/12 |
| 2020/0349365 | A1 * | 11/2020 | Behrendt | G06N 3/08 |

* cited by examiner

ASSISTED IMAGE ANNOTATION

CROSS REFERENCE TO OTHER APPLICATIONS

This application claims priority to U.S. Provisional Patent Application No. 62/669,264 entitled PREDICTIVE BOUNDING BOXES filed May 9, 2018 which is incorporated herein by reference for all purposes, and U.S. Provisional Patent Application No. 62/835,288 entitled PREDICTIVE BOUNDING BOX filed Apr. 17, 2019 which is incorporated herein by reference for all purposes.

BACKGROUND OF THE INVENTION

Computer vision is a technology field with many applications, such as self-driving cars, warehouse management, farm management, satellite image processing, medical image recognition, etc. Machine learning (ML) has been applied to many computer vision problems. Examples (also referred to as training data) are sent to a machine learning model, which adapts based on the training data to improve its recognition capabilities.

Historically, humans are more accurate than computers for processing and extracting information from images. Human annotation, however, is usually much slower and more costly to obtain than machine annotation. There are situations where human input is required. For example, training machine learning models to recognize and classify objects often requires a large number of samples. For instance, to recognize whether an object in an image is a car or a person requires sending to a machine learning model a large number of samples, most of which depict a car, a person, or both. The ML model is trained based on these samples by making annotations and adapting itself to minimize errors. To generate large sample data sets required for training and building machine learning models, existing techniques typically require human annotators to manually annotate objects in images (e.g., draw bounding boxes around objects, classify objects, etc.). This is referred to as crowd-sourced annotation. Once a machine learning model has been trained, it can annotate the image like humans do. To obtain enough human annotated samples to effectively train a machine is often costly and time consuming. It would be useful to have a way to improve the throughput of human annotation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Image annotation is disclosed. In some embodiments, initial object prediction information associated with an image is accessed. The initial object prediction information includes a plurality of initial predictions associated with a plurality of objects in the image, including bounding box information associated with the plurality of objects. The image and at least a portion of the initial object prediction information are presented to be displayed. Adjusted object prediction information is received. The adjusted object prediction information is obtained from a user input made via a user interface configured for a user to make annotation adjustments to at least some of the initial object prediction information. Updated object prediction information is output. The technique allows for machine-assisted image annotation and greatly improves the speed and accuracy at which human annotators perform image annotation tasks.

Figure 1:
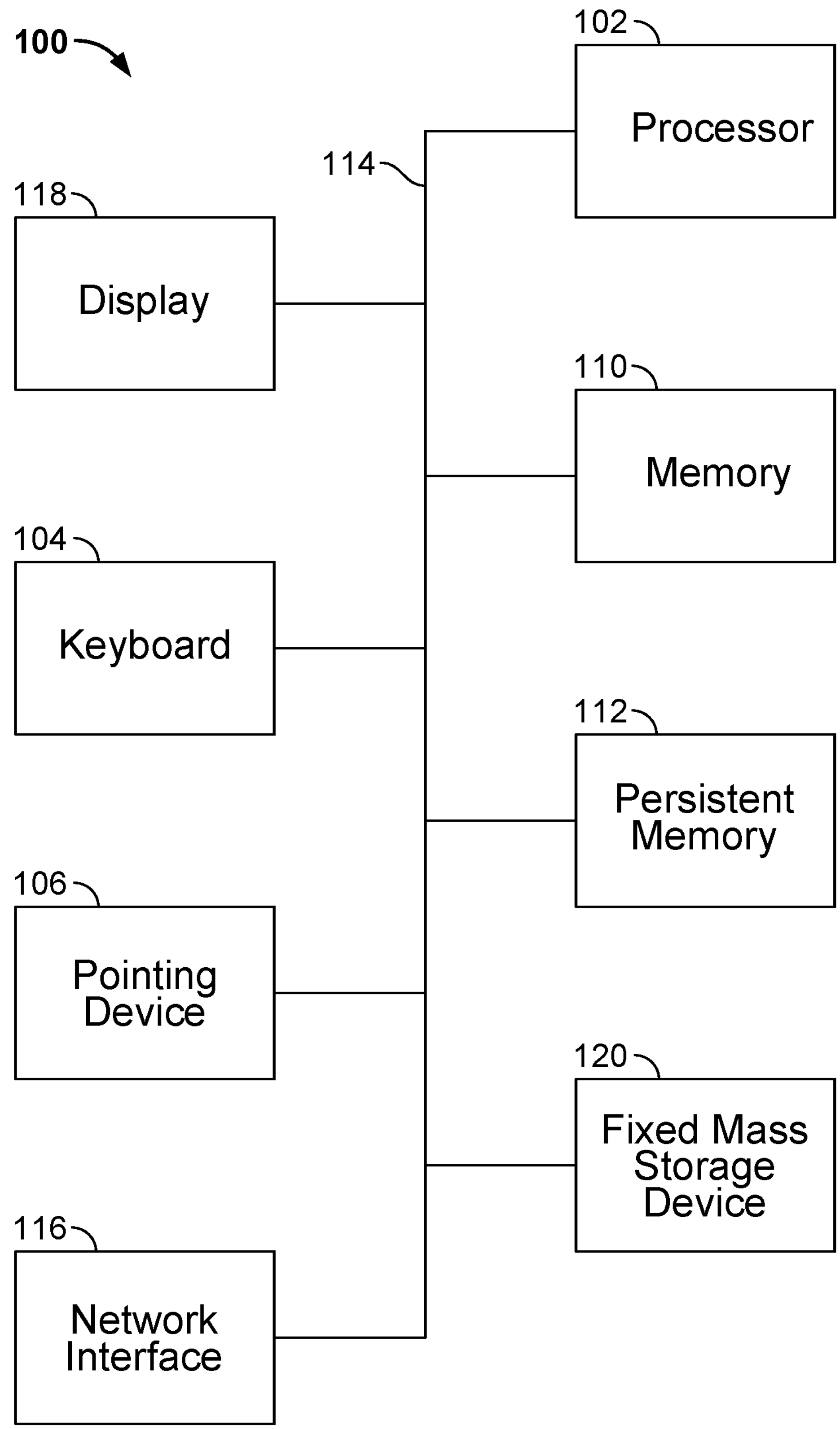
FIG. 1 is a functional diagram illustrating a programmed computer system for image annotation in accordance with some embodiments.

FIG. 1 is a functional diagram illustrating a programmed computer system for image annotation in accordance with some embodiments. As will be apparent, other computer system architectures and configurations can be used to perform annotation. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute the functions and processes described below with respect to FIGS. 3-10.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
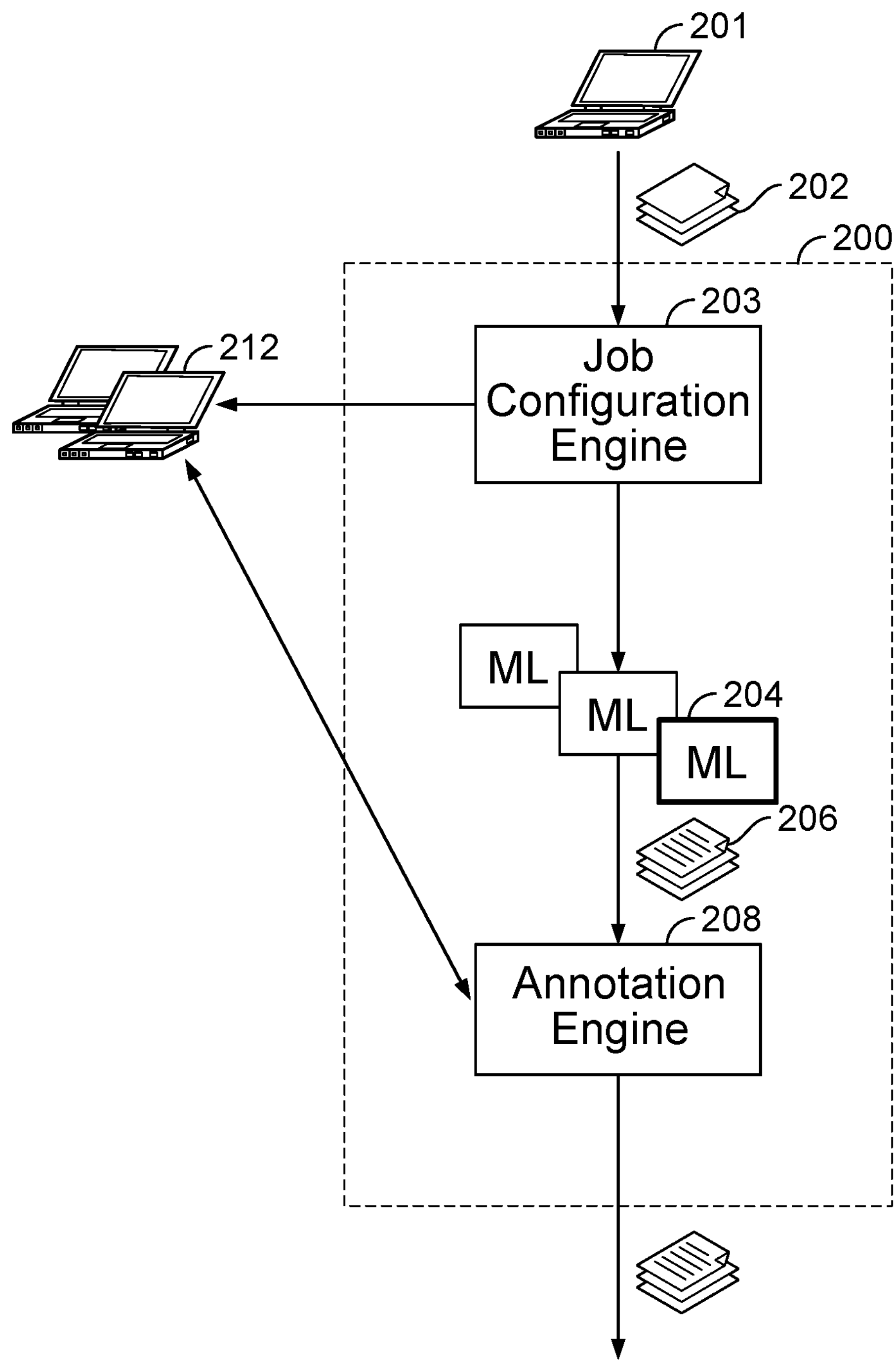
FIG. 2 is a block diagram illustrating an embodiment of an annotation platform.

FIG. 2 is a block diagram illustrating an embodiment of an annotation platform. In this example, annotation platform 200 can be a Figure Eight® annotation platform and can be implemented on one or more devices such as 100, on a cloud-based platform, or the like. The annotation platform provides user interface (UI) components for requesters to request jobs and for annotator users to complete jobs, as well as ML models to preprocess images.

As shown, a requester (e.g., a customer of the platform) uses device 201 to access annotation platform 200 and provides a set of images 202 to the annotation platform for annotation. The requester can interact with annotation platform 200 using a browser-based application, a standalone client application, or the like.

A job configuration engine 203 provides user interfaces and logic for the requester to specify the requirements for an annotation job, such as the specific types of objects to be annotated, the definitions for these types of objects, whether to annotate half an object, whether to annotate objects in the background, etc. The requester interacts with job configuration engine 203 on the platform to configure the job, providing requirements and payment information. In this example, annotators on the platform are human users that access the annotation platform using client devices 212 via browser-based applications, standalone applications, or the like. In some embodiments, the requester notifies annotators on the platform that the job is available, and the annotators select the job to participate. In some embodiments, the requester selects the annotators.

Figure 10:
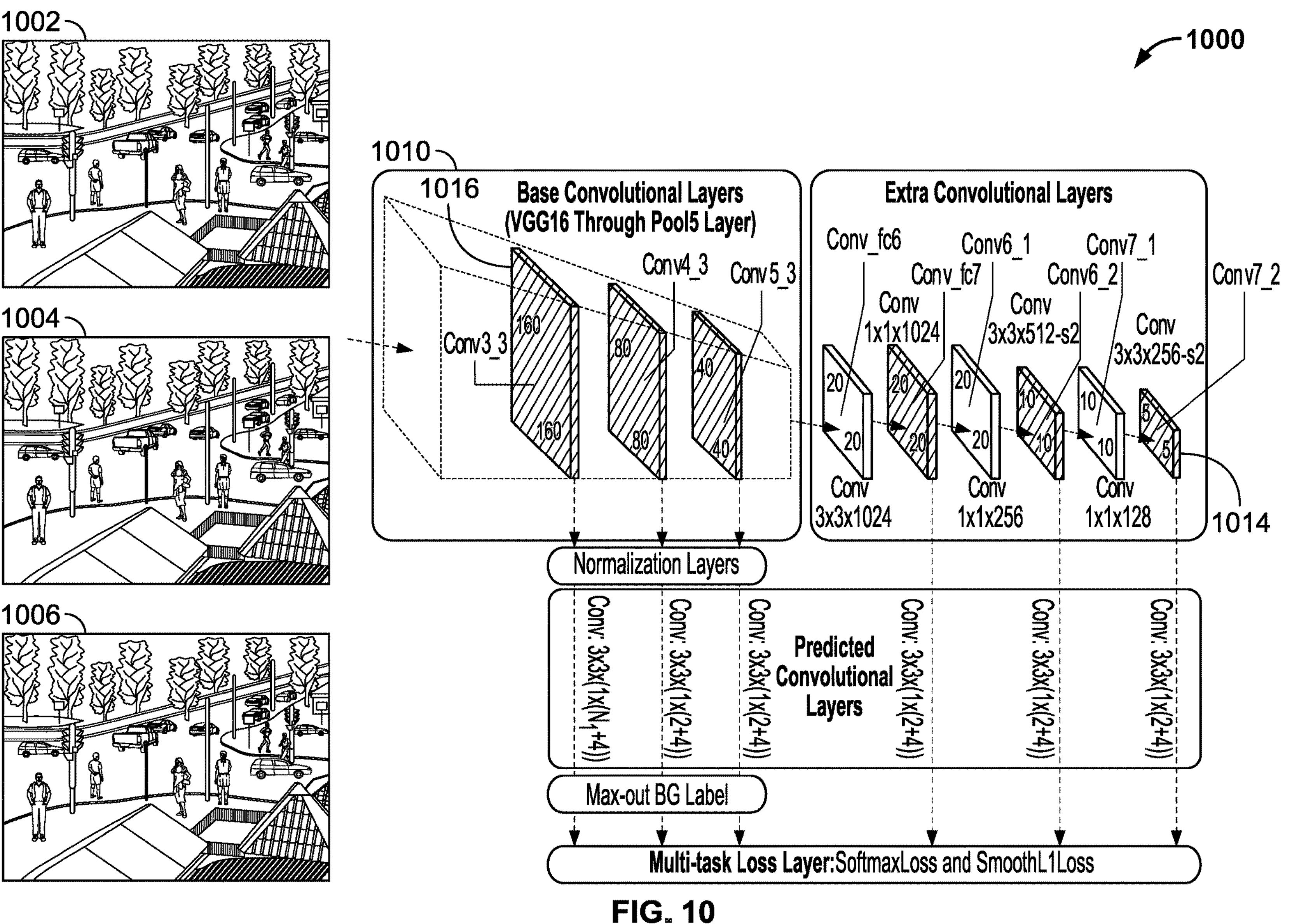
FIG. 10 is a block diagram illustrating an example of a machine learning model.

In this example, the platform provides multiple ML models 204 that can be used to preprocess the images. Any appropriate ML model capable of annotating (e.g., locating and classifying) objects in an image can be used, such as convolutional neural networks (CNNs), FasterRCNN, YOLO, single shot detector (SSD), Hand Craft features based ML classifiers like Random Forest, support vector machines, etc. An example of an ML model is shown in FIG. 10. Job configuration engine 203 provides the requester with performance information for each ML model on common object datasets such as COCO and Pascal VOC. Job configuration engine 203 further provides an interface for the requester to select an ML model among the available models to preprocess the images and make an initial set of annotations. The selected ML model has been trained on similar types of images, and is able to analyze each image (e.g., identify features in the image by using convolutional filters or other standard techniques), annotate the image by determining bounding boxes around features that are identified as objects in the image (e.g., determine coordinates of the corners of a rectangular bounding box), and classify each object (e.g., label an object as a car, another object as a person, etc.). These operations performed by the ML model are collectively referred to as object prediction. A confidence level is associated with the bounding box and classification of an object, indicating how confident the model is in making a particular prediction. In some embodiments, the confidence level is generated by the ML model using standard, probability-based formulas. The ML model outputs object prediction information 206 associated with each annotated image, including the coordinate information of the bounding boxes surrounding the annotated objects, the classifications for the objects, and the respective confidence levels.

In some embodiments, the requester specifies a confidence level threshold. In the ML model output 206, prediction information associated with objects that meets the confidence level threshold is kept and the rest is discarded.

It is assumed that the ML models are trained on relatively small sample sets and are less accurate than human annotators; therefore, the initial object predictions generated by the ML model are verified and/or adjusted by the human annotators to achieve greater accuracy. Compared with not having any initial predictions, having the initial ML-generated object predictions as a starting point allows the annotators to go through images at a much faster rate. As will be discussed in greater detail below, the initial set of annotations coupled with appropriate user interface tools can improve annotation throughput significantly while maintaining human-level accuracy.

The annotator interacts with an annotation engine 208 via a client application on client device 212. In this example, the client application and annotation engine 204 cooperate to provide a user interface that displays the image and optionally at least a portion of the initial object prediction information to the human annotator.

The client application (e.g., a browser-based application or a standalone application) provides a user interface configured to display the image and associated object prediction information to the annotator user. As will be explained in greater detail below, in some situations not all of the bounding boxes are displayed in order to avoid a cluttered image that may cause user fatigue and reduce accuracy.

The user interface is further configured to interact with the image and the prediction information, and assist the user in making annotation adjustments. The user interface assists the annotator user to select which objects/bounding boxes to view and/or edit, adjust the size and location of the bounding boxes, change the classification of an object, save the updated information, or otherwise make changes to the initial object prediction information provided by the ML model.

FIGS. 5A-9D are diagrams illustrating various embodiments of user interfaces configured to assist the user in making annotation adjustments. The human user can fine tune the initial object predictions by changing, deleting, and/or adding bounding boxes, changing classifications, etc. By presenting the image and machine-generated object prediction information such as bounding boxes associated with the objects in the image to the annotator user as a basis for annotation, the annotator user can make adjustments to existing bounding boxes rather than going through the laborious process of drawing each box individually, thereby shortening the amount of processing time required to process each image.

In some embodiments, an HTML canvas with Javascript is used to implement the user interface of a client application executing on clients such as 212, and provide a front end for the annotator user to draw or adjust bounding boxes around objects of interest, record the classification names of objects, etc. In some embodiments, a graphic user interface is implemented in a browser and a browser-based overlaying HTML element is used. In these cases, a browser-based implementation displays images and an HTML canvas is overlaid over the image that is displayed. The canvas is an HTML element that allows user interactions, enabling a user to input an annotation by drawing a bounding box onto the canvas. In this manner, a user is able to interact by, for example, clicking and dragging a cursor to draw a box around an object in an image or adjust the coordinates of a box. An annotation or box received as an input to the system defines or specifies a set of coordinates on an image. In some embodiments, updated annotation information is sent to annotation engine 208. The information sent to the annotation engine includes, for example, updated coordinates associated with bounding boxes, updated object classifications, etc. In some embodiments, as an annotation is made or a box is drawn around an object, an object identifier or ID is associated with the annotation or box, and a post is sent to the server.

In some embodiments, a standalone client application is implemented using a programming language such as Java, C, C++, Objective C, etc. The user interface can be configured using appropriate application programming interfaces (APIs) and library functions, and performs similar operations as described above.

Figure 3:
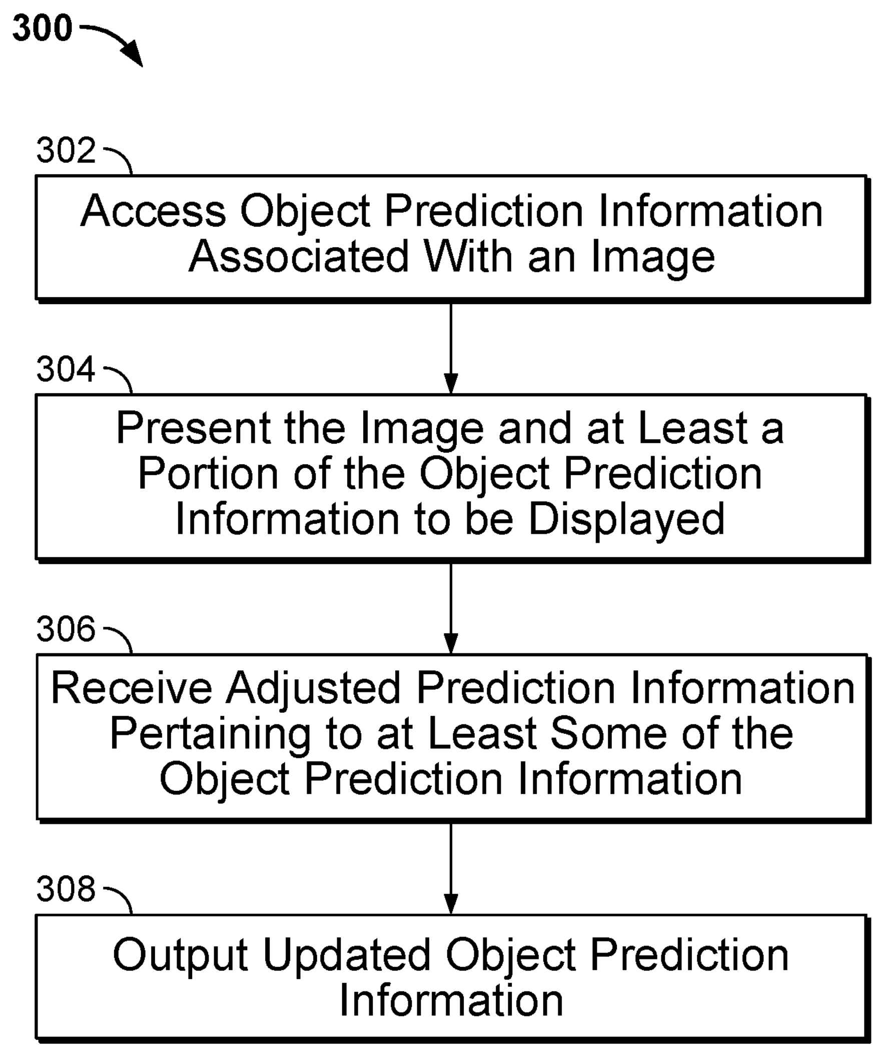
FIG. 3 is a flowchart illustrating an embodiment of a process for an assisted image annotation process.

FIG. 3 is a flowchart illustrating an embodiment of a process for an assisted image annotation process. Process 300 can be performed on a system such as 100 or 200. In various embodiments, process 300 can be performed by a server such as annotation engine 208, or on a client device such as 212.

At 302, initial object prediction information associated with an image is accessed. In some embodiments, the initial object prediction information is accessed by the annotation engine and is retrieved from a storage location, or received from another application module such as a machine learning model that has preprocessed the image and made a set of initial predictions on objects in the image. In some embodiments, the initial object prediction information is received at the client from the annotation engine.

The machine learning model, such as the ML model selected by the requester of FIG. 2, has been trained using known techniques to perform object prediction. In this example, the image is input into the ML model, which applies a series of convolutional filters to the input, identifies features (e.g., objects) on the image, classifies the image using a classifier such as a binary classifier, a decision tree, a support vector machine, a logistic regression classifier, etc., and outputs initial object prediction information such as bounding box coordinate information and classification information associated with objects in the image. Details of the ML model are described below in connection with FIG. 10. The ML model also outputs a confidence level associated with a bounding box and classification associated with each object. The confidence level can be generated functions provided by the ML model based on standard formulas.

At 304, the image and at least a portion of the object prediction information are presented to be displayed. In some embodiments, the image and object prediction information (e.g., bounding boxes) are presented by a server such as an annotation engine to a client device to be displayed. In particular, the image and object prediction information (in their original form and/or processed to include rendering information) are transmitted via a predefined protocol to a client application on the client device to be displayed. In some embodiments, the image and at least a portion of the object prediction information received from a server at a client device are presented by the client application to be displayed.

Returning to FIG. 3, at 306, adjusted prediction information pertaining to at least some of the objects in the image is received. In some embodiments, using the user interface, the annotator user makes changes to bounding box coordinates and/or classification of an object, and the adjusted prediction information is received by the client application. In some embodiments, the adjusted prediction information is sent by the client application to the platform, and is received by the annotation engine.

At 308, updated object prediction information is output. The updated object prediction information is based on the adjusted object prediction information. In some embodiments, the updated object prediction information includes the adjusted object prediction information, and is output by the client application to a server such as the annotation engine. In some embodiments, the initial coordinate information and/or initial classification information of adjusted objects is replaced or modified by the adjusted object prediction information to generate the updated object prediction information. In some embodiments, a server such as the annotation engine updates the object prediction information and outputs the information. The information can be sent to storage, to the requester's device, to another module of the annotation platform such as an aggregator to be aggregated with other annotator users' annotations, to an ML model for training, to a separate application, or to any other appropriate destination.

In some cases, there is no applicable ML model available initially. In such cases, one or more human annotator users annotate a set of sample images, and use the annotation results to train an ML model. Once an ML model such as 204 becomes established, process 300 can be invoked to assist future annotation by annotator users.

Figure 4:
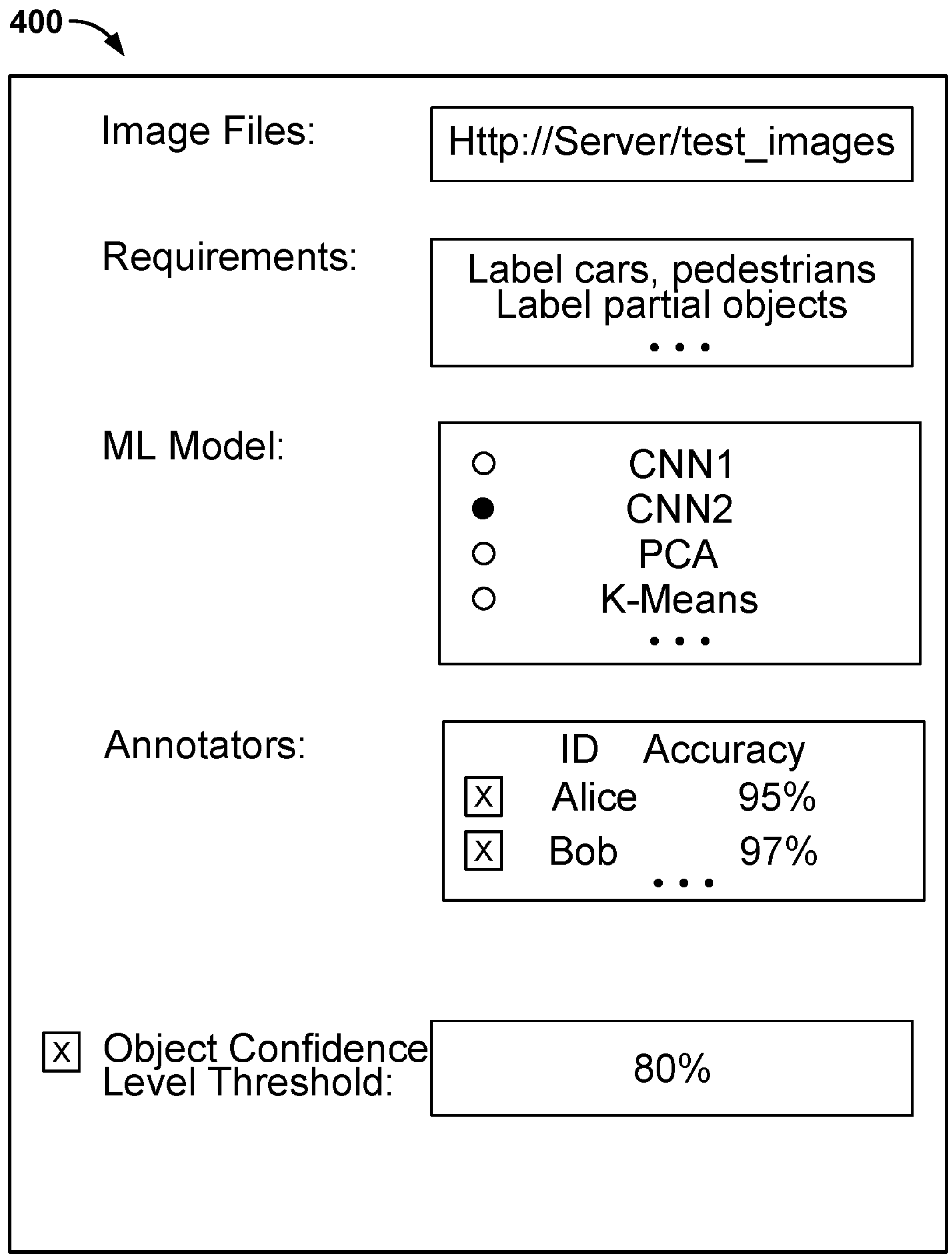
FIG. 4 is a user interface diagram illustrating an embodiment of a configuration interface.

FIG. 4 is a user interface diagram illustrating an embodiment of a configuration interface. Configuration interface 400 allows the requester to, among other things, specify the location of image files to be annotated, specify the requirements of the job, select the ML model, and select the annotators. In this example, the requester is also given the option to specify a confidence level threshold. If the confidence level threshold is specified, in some embodiments, only the annotations that meet or exceed the confidence level threshold are kept and verified by the annotator users; in other embodiments, the annotations that meet or exceed the confidence level threshold are displayed while the rest of the annotations are hidden from view or indicated by a hint. In some embodiments, the user interface provides an option to specify a confidence level range, and only the annotations with confidence levels within the range are kept and verified by the annotator users.

Figure 5A:
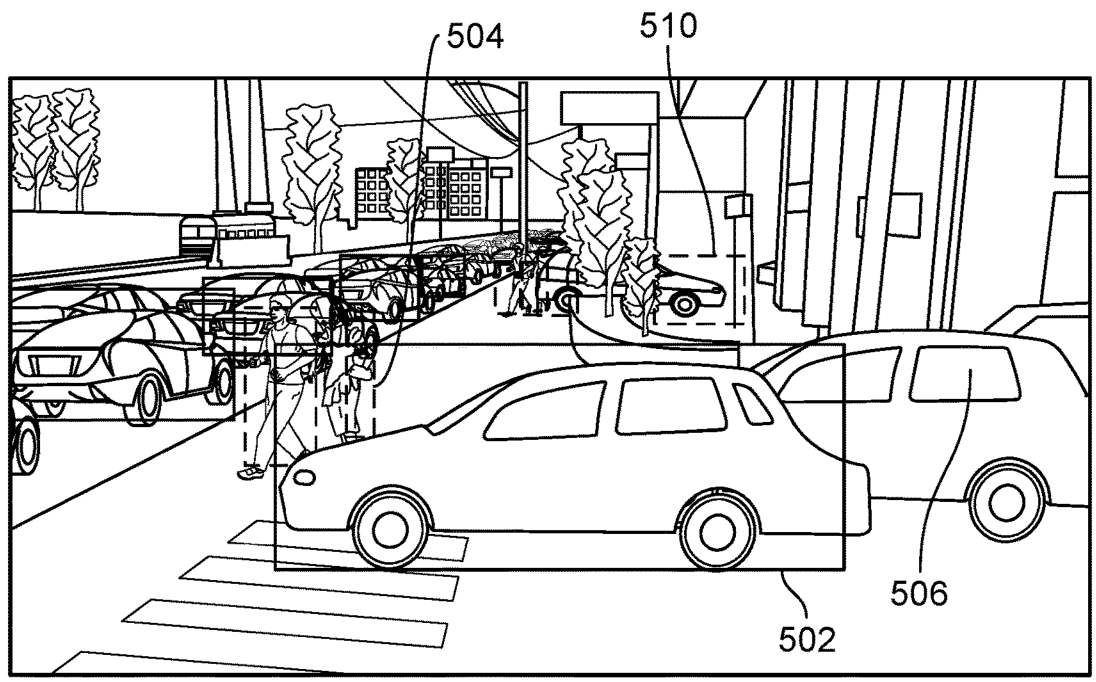
FIGS. 5A-5B are screenshots illustrating an example user interface for assisted annotation.
Figure 5B:
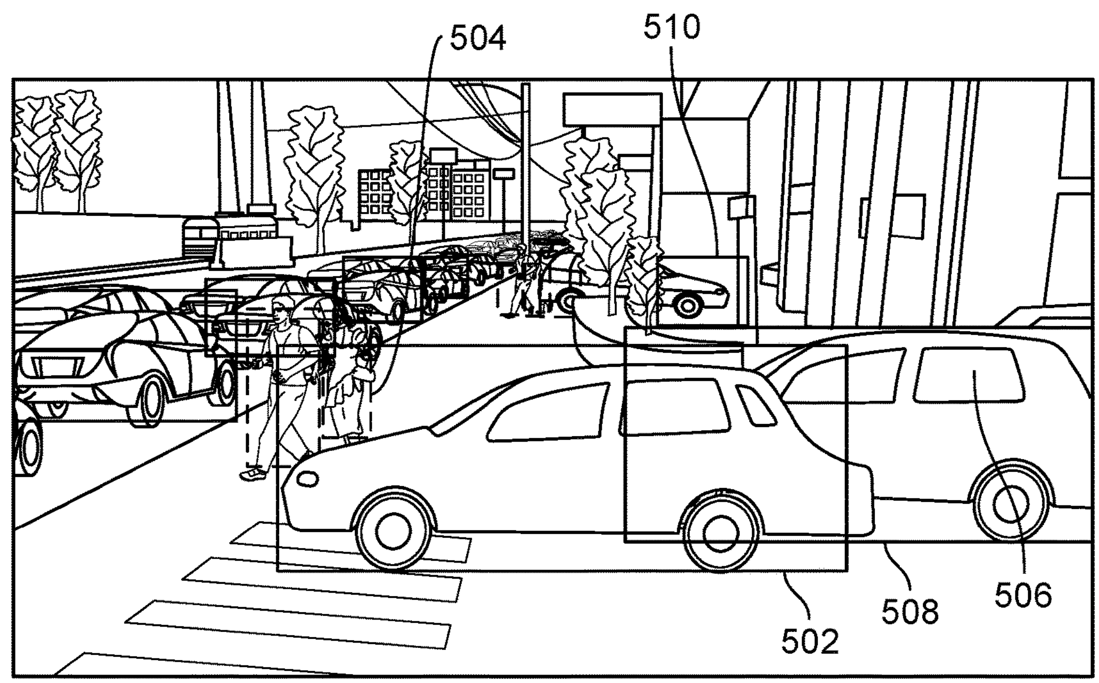

FIGS. 5A-5B are screenshots illustrating an example user interface for assisted annotation. In this example, the initial predicted bounding boxes of all the objects, or in cases where a confidence level threshold is set, the initial predicted bounding boxes of objects that at least meet the confidence level threshold are referred to as the qualifying bounding boxes. The qualifying boxes are displayed as suggestions for the annotator user. In FIG. 5A, the initial machine-predicted bounding boxes are superimposed on the image. The machine makes a best-effort guess at where objects are located, and draws a bounding box around the object. As shown, green boxes such as 504 correspond to pedestrians and red boxes such as 502 correspond to cars. While rectangular boxes are shown and discussed extensively in the examples below, the bounding boxes can be other shapes such as circles, other types of polygons, etc.

While the objective is to draw the smallest possible bounding box that fully encloses the object, the ML model sometimes fails to do so, and may draw the boxes that are too small or too large, that overlap with the object, or may fail to draw boxes completely. The annotator user will take the bounding boxes as suggestions and make modifications as appropriate. In particular, the user can make annotation adjustments via the user interface by first selecting (e.g., clicking on) a specific bounding box and then adjusting it (e.g., moving, resizing, or deleting the bounding box). For example, in FIG. 5A, the ML model-generated annotation box 502 around the vehicle in the foreground does not cover the entire vehicle; annotation box 504 around a pedestrian does not cover the entire pedestrian; the ML model has either missed a vehicle 506 in the background or had such low confidence that the annotation is left out from the displayed collection; and an object 510 has been misclassified (shown with a green box corresponding to a pedestrian rather than a red box corresponding to a vehicle). The annotator user is able to use the UI provided by the client to make adjustments. In particular, the user can click or tap to select a bounding box, drag a cursor to change the coordinates of the corners of the box, right-click to open up a properties editor (not shown) to change the type of object, or perform other annotation-related actions.

As shown in the resulting image in FIG. 5B, boxes 502 and 504 are adjusted to cover the entire objects, a new bounding box 508 is added around vehicle 506, and object 510 has been reclassified as a vehicle (shown with a red box). Since the user does not need to draw each box from scratch, this annotation technique improves the speed at which an annotator can process an image.

Figure 6A:
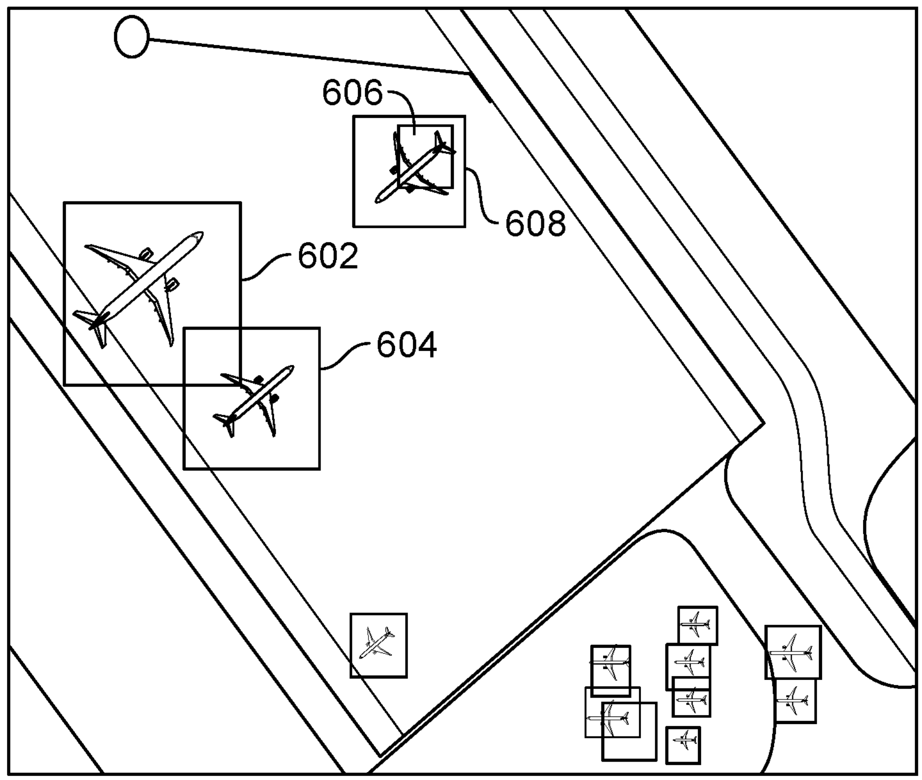
FIGS. 6A-6B are screenshots illustrating another example user interface for assisted annotation.
Figure 6B:
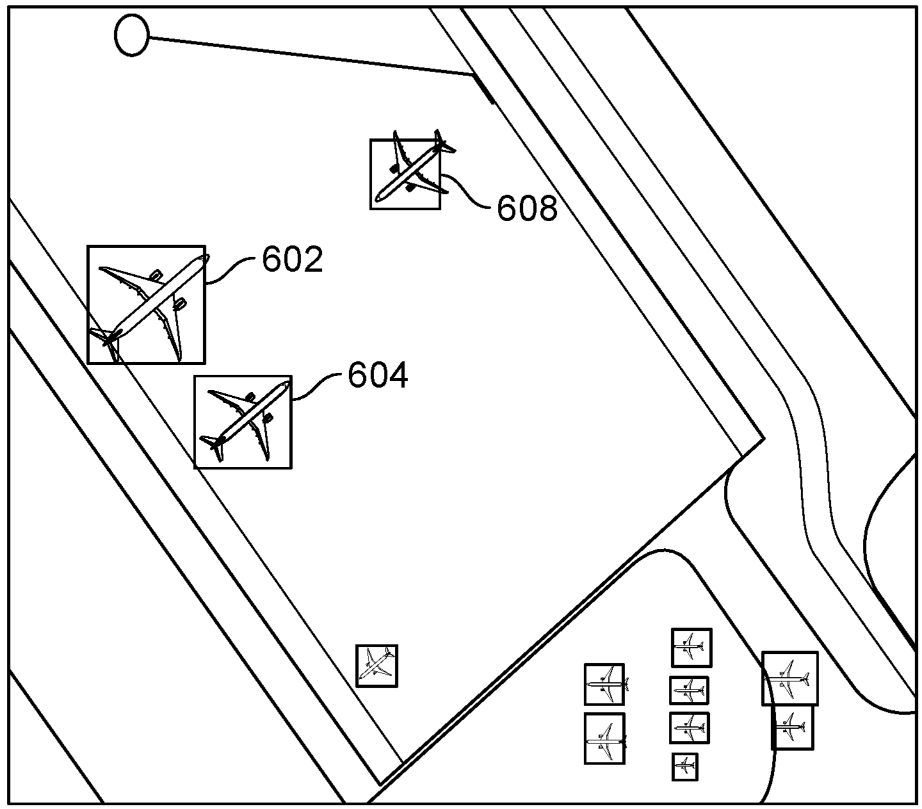

FIGS. 6A-6B are screenshots illustrating another example user interface for assisted annotation. In this example, the initial predictions are shown in FIG. 6A. The annotator user is not required to click on a box in order to edit the box. Rather, the UI tool allows the user to activate a bounding box (e.g., making the box editable) by using the cursor. In this case, when the user moves the mouse such that the cursor is over the object or the bounding box (e.g., when the cursor hovers over the object or the bounding box), the bounding box is activated and ready to be edited. The adjusted result is shown in FIG. 6B, where the user has adjusted the bounding box sizes for planes 602 and 604, as well as deleting box 606 and resizing box 608. Once the user has completed the annotation, he can submit the result by clicking on a submit button (not shown).

When there are lots of objects in an image, displaying all the initial predicted bounding boxes or all the qualifying predicted bounding boxes using the technique shown above may result in a cluttered image, which can cause eye fatigue for the annotator user and reduce accuracy and throughput. Thus, in some embodiments, rather than displaying all the bounding boxes, only a portion of the bounding boxes are selectively displayed and the rest of the bounding boxes are hidden.

Figure 7:
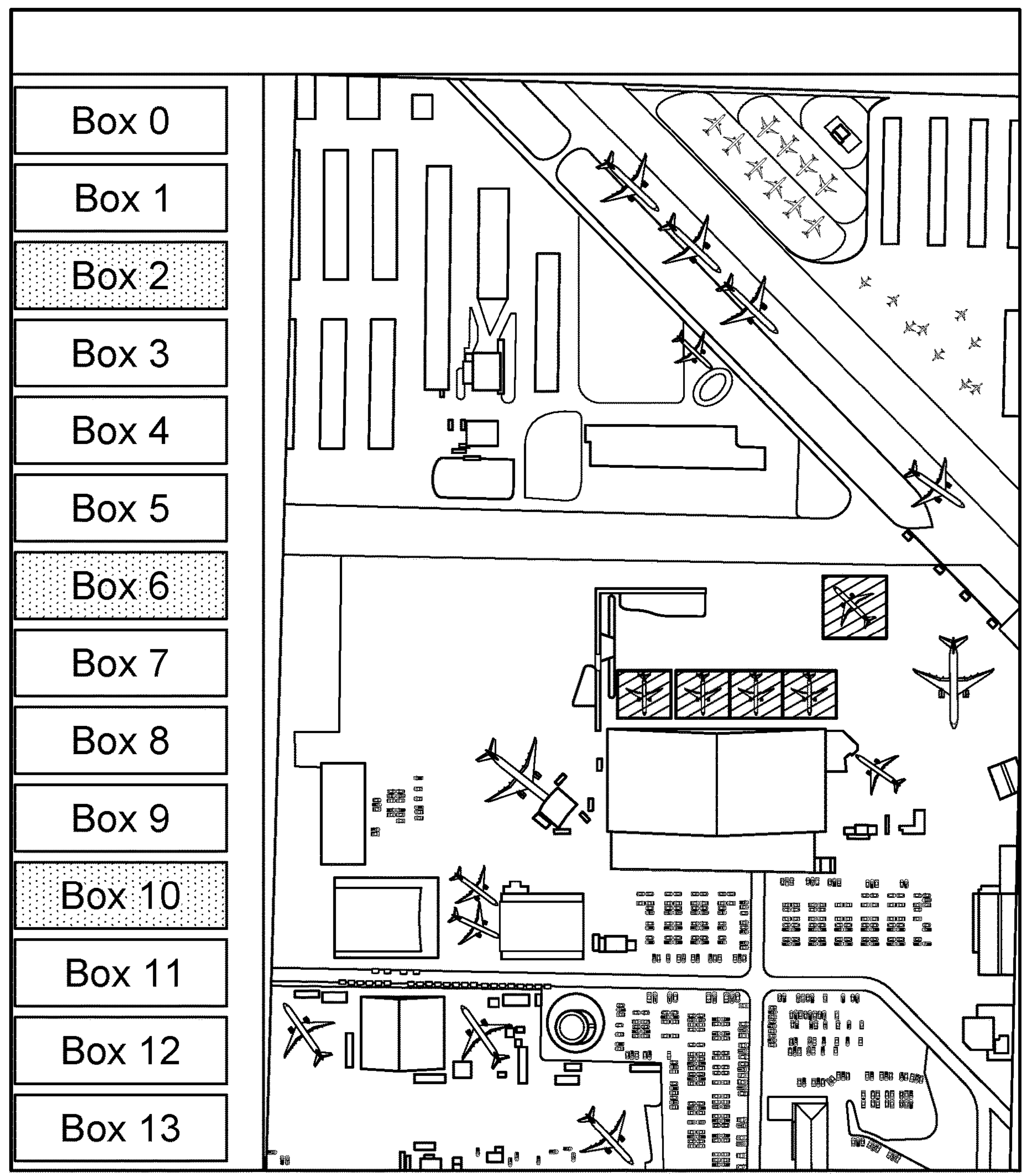
FIG. 7 is a screenshot illustrating another example user interface for assisted annotation.

FIG. 7 is a screenshot illustrating another example user interface for assisted annotation. In this example, N qualifying predicted bounding boxes that are nearest to the cursor (N being a predefined natural number and is set to 5 in this case) are activated (e.g., displayed and made editable). In some embodiments, an area around the cursor location (e.g., a circle of a certain diameter or a square of a certain size centered at the cursor location) is determined and all objects within the area are activated and made editable.

Figure 8:
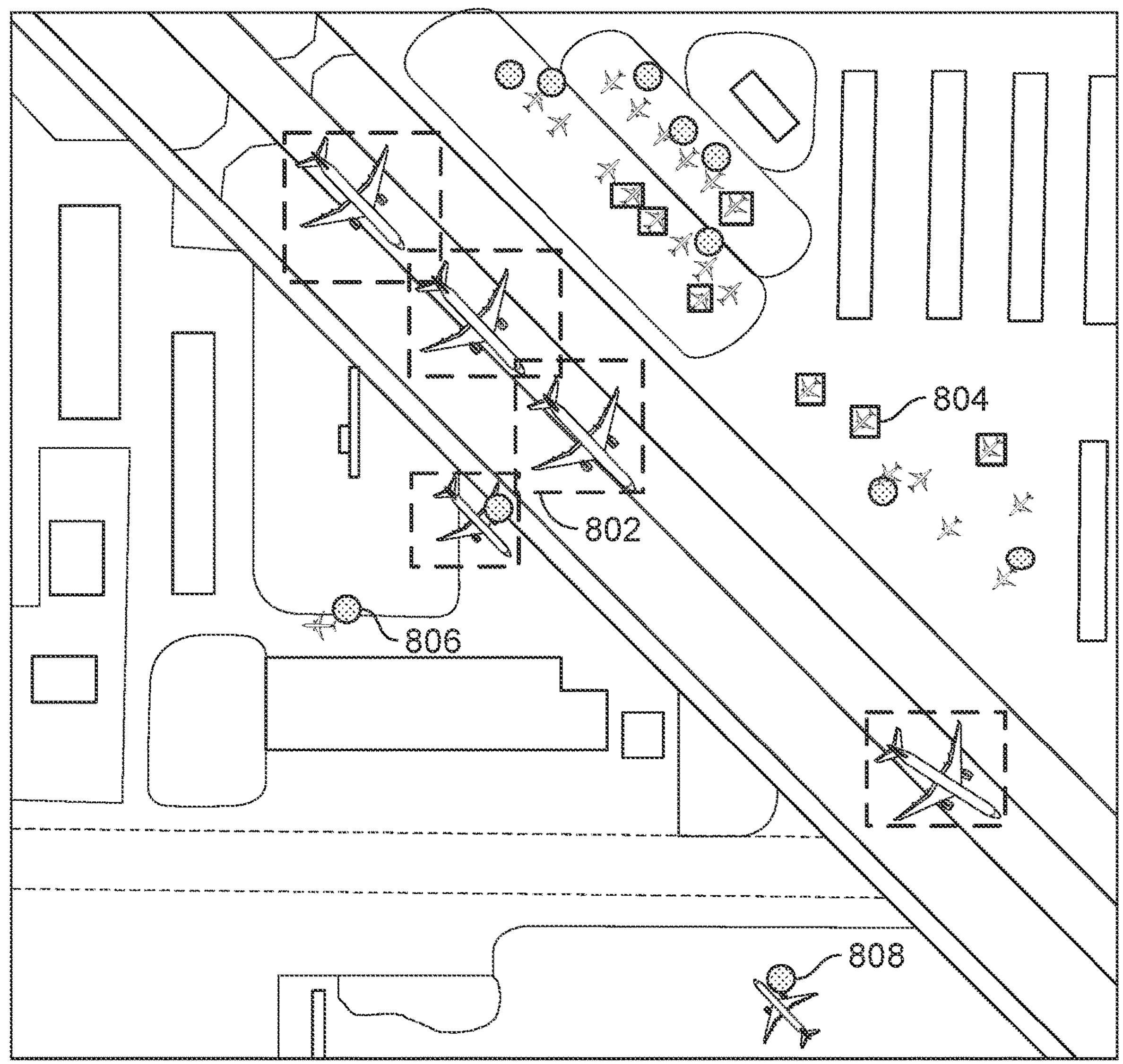
FIG. 8 is a screenshot illustrating an example user interface for assisted annotation that uses hints.

In some embodiments, hints are used to make suggestions to the annotator user without making the screen appear cluttered. As used herein, a hint refers to a symbol or marking such as a dot, a line, etc., and is usually more compact than a bounding box and takes up less screen real estate. A hint is placed on or next to an object to indicate that the ML model has determined that there is an object in the vicinity. FIG. 8 is a screenshot illustrating an example user interface for assisted annotation that uses hints. In this example, a dot serves as a hint. Initial bounding boxes of objects that at least meet the confidence level threshold, such as large plane 802, small plane 804, etc. are displayed in full. For predictions that do not meet the confidence level, their bounding boxes are hidden and a dot is placed next to the object as a hint (see, e.g., 806 and 808). When the user clicks on or hovers the cursor over the hint, the corresponding predicted bounding box of the object is revealed, and the user can use the UI tool to adjust or delete the bounding box.

In some embodiments, the hint dynamically changes during the annotation process. FIGS. 9A-9D are screenshots illustrating another example user interface for assisted annotation that uses hints.

Figure 9A:
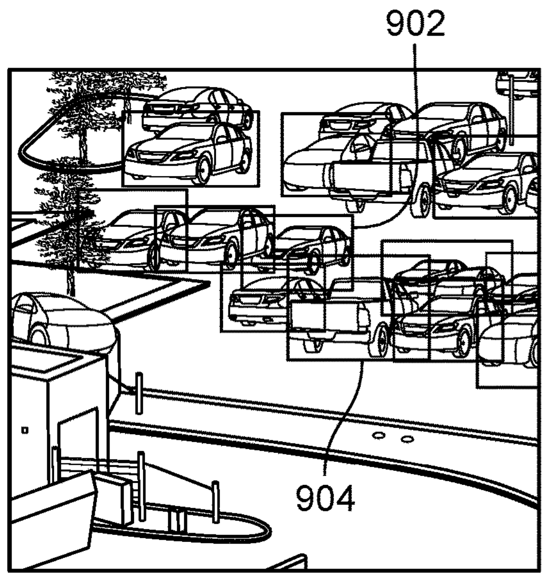
FIGS. 9A-9D are screenshots illustrating another example user interface for assisted annotation that uses hints.

FIG. 9A is the original image with all the bounding boxes. The image appears cluttered because there are many overlapping boxes.

Figure 9B:
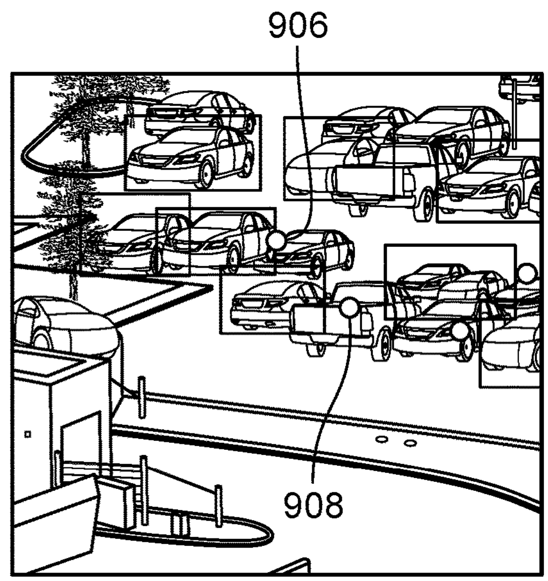

In FIG. 9B, objects whose bounding boxes have a high number of overlaps (e.g., number of overlaps exceeds a predetermined threshold), such as 902, 904, etc. of FIG. 9A, are identified. Their corresponding bounding boxes are transformed into hints, specifically yellow dots 906, 908, etc. The image is less cluttered and the hint reminds the user of which objects besides the ones with bounding boxes still need to be checked.

Figure 9C:
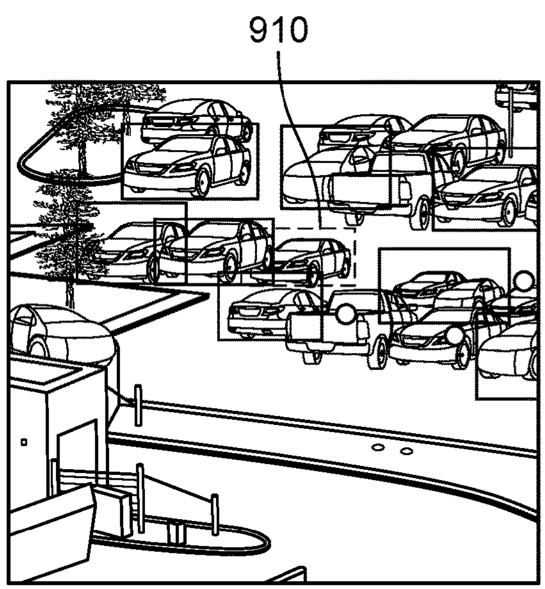

In FIG. 9C, the user clicks on a hint dot 906 to cause the corresponding bounding box 910 for the object to be displayed and become editable. While the user is adjusting the bounding box, it is displayed as a different color than the rest of the bounding boxes (green instead of red).

Figure 9D:
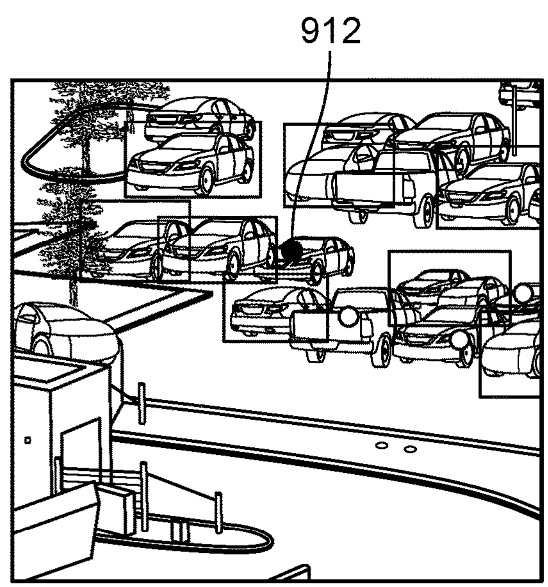

In FIG. 9D, when the user finishes adjusting the bounding box, if the resulting bounding box still has a high number of overlaps with other bounding boxes, the resulting bounding box 910 is transformed back to a hint dot 912. In some embodiments, the updated hint dot is distinct from the initial hint dot (as well as the remaining unprocessed hint dots) in appearance. In this example, the updated hint dot is a different color (e.g., green instead of yellow). In other embodiments, the updated hint dot can have a different shape, shading, etc. This way, the screen remains uncluttered while the user is provided with visual cues to help keep track of which objects still need to be processed.

FIG. 10 is a block diagram illustrating an example of a machine learning model. In this example, model 1000 employs a convolutional neural network (CNN) to generate a feature map based on input channels of an image, and can be used to implement 204 of FIG. 2.

The CNN is a type of deep learning neural network for analyzing images and identifying features. Any appropriate CNN implementation can be used, such as Faster RCNN, SSD, YOLO, etc. In this example, 1002-1006 are the Red (R), Green(G), and Blue(B) channels, respectively. A three-dimensional matrix is used to represent the channels (with dimensions X and Y corresponding to height and width of the images, and dimension Z corresponding to the channels). The matrix is sent to the CNN as input. The CNN includes multiple layers, where the first layer applies a convolutional filter to the input and each subsequent layer applies a different convolutional filter to the output of the previous layer. The successive layers each detect a specific type of data (usually a higher level of feature than the previous layer). For example, the first CNN layer detects edges in horizontal, vertical, or diagonal directions, the second CNN layer detects curves based on the previously detected edge data, and the third layer detects features, etc. Additional layers can be used.

The CNN employs a multi-scale approach where different convolutional layers use convolutional filters of different sizes to detect objects at different scales and output feature maps at different scales. As shown, stage 1010 includes base convolutional layers that produce initial/earlier stage features and stage 1012 includes additional convolutional and pooling layers that further reduce the feature map size by concentrating on the features in smaller area. Each convolutional layer generates a feature map that indicates the pixels that possibly correspond to the features (e.g., the objects) in the image. The sizes of features detected by different convolutional layers are different. Earlier convolutional layers that uses fewer filters and detect smaller objects than later convolutional layers that use more filters and detect bigger objects. For example, layer 1014 can be used to detect bigger objects (e.g., objects in the foreground) than layer 1016. Bounding boxes can be drawn around the features, and a standard classifier can be applied to the features output by the CNN to determine the type of object. Based on the input object pixels, the classifier's model will determine the corresponding types for the objects. The classifier (e.g., random forest classifier, support vector machine classifier, etc.) can be pre-trained to recognize certain types of objects (e.g., person, car, building, etc.) using techniques such as fully connected layers with soft max function, support vector machine, etc. The CNN and classifier can be implemented using Caffe, PyTorch, KIeras, Tensorflow or other appropriate libraries. In some embodiments, a classification library function gives the classification result an associated confidence score, indicating the confidence level for the classification result being correct (e.g., 90% confidence in the object being a car).

Assisted image annotation has been disclosed. By using existing object prediction information, in particular, machine-generated object prediction information as a basis and providing a user interface for an annotator user to make adjustments to the existing object prediction information, the speed of annotation is greatly improved while maintaining the accuracy level of human annotators.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

accessing initial object prediction information associated with an image, wherein the initial object prediction information includes a plurality of initial predictions associated with a plurality of objects in the image, including bounding box information associated with the plurality of objects;

presenting the image and at least a portion of the initial object prediction information to be displayed;

receiving adjusted object prediction information pertaining to at least some of the plurality of objects, wherein the adjusted object prediction information is obtained from a user input made via a user interface configured for a user to make annotation adjustments to at least some of the initial object prediction information; wherein the user interface is configured to allow the user to:

select a bounding box associated with an object and directly adjust the bounding box using the user interface; or change a type associated with the object using the user interface; and outputting updated object prediction information, wherein the updated object prediction information is based at least in part on the adjusted object prediction information; wherein:

the image and bounding boxes associated with a subset of objects in the image are displayed;

the subset of objects have corresponding confidence levels that at least meet a prespecified confidence level threshold;

a corresponding confidence level of an object in the subset of objects indicates how confident a machine learning model is in making a prediction associated with the object, the prediction including a bounding box of the object;

the image and a hint associated with an object in the image are displayed, the hint being a visual indication of an object that is more compact than a bounding box associated with the object; and the user interface is further configured to, in response to the hint being selected, display the bounding box associated with the object.

2. The method of claim 1, wherein the initial object prediction information is generated by the machine learning (ML) model.

3. The method of claim 1, wherein the initial object prediction information further includes classification information associated with the plurality of objects in the image.

4. The method of claim 1, wherein the user interface is configured to, in response to a cursor being placed over or near a predicted bounding box or an object, provide an editing interface for the predicted bounding box.

5. The method of claim 1, wherein the user interface is configured to, in response to a cursor being placed over an object or a bounding box that is hidden, display the bounding box associated with the object.

6. The method of claim 1, wherein:

the user interface is configured to make bounding boxes of N objects closest to a cursor visible and hide remaining bounding boxes of other objects, wherein N is a prespecified natural number.

7. The method of claim 1, wherein:

the image and a hint associated with an object in the image are displayed; and the user interface is further configured to:

in response to the hint being selected, display a bounding box associated with the object and allow the user to make an adjustment to the bounding box; and in response to receiving the user input, update prediction information associated with the bounding box.

8. The method of claim 1, wherein:

the image and an initial hint associated with an object in the image are displayed; and the user interface is further configured to:

in response to the initial hint being selected, display a bounding box associated with the object and allow the user to make an adjustment to the bounding box;

in response to receiving the user input, update prediction information associated with the bounding box; and replace the bounding box with an updated hint that is distinct from the initial hint.

9. A system, comprising:

one or more processors configured to:

access initial object prediction information associated with an image, wherein the initial object prediction information includes a plurality of initial predictions associated with a plurality of objects in the image, including bounding box information associated with the plurality of objects;

present the image and at least a portion of the initial object prediction information to be displayed;

receive adjusted object prediction information pertaining to at least some of the plurality of objects, wherein the adjusted object prediction information is obtained from a user input made via a user interface configured for a user to make annotation adjustments to at least some of the initial object prediction information; wherein the user interface is configured to allow the user to:

select a bounding box associated with an object and directly adjust the bounding box using the user interface; or change a type associated with the object using the user interface; and output updated object prediction information, wherein the updated object prediction information is based at least in part on the adjusted object prediction information; wherein:

the image and bounding boxes associated with a subset of objects in the image are displayed;

the subset of objects have corresponding confidence levels that at least meet a prespecified confidence level threshold;

a corresponding confidence level of an object in the subset of objects indicates how confident a machine learning model is in making a prediction associated with the object, the prediction including a bounding box of the object;

the image and a hint associated with an object in the image are displayed, the hint being a visual indication of an object that is more compact than a bounding box associated with the object; and the user interface is further configured to, in response to the hint being selected, display the bounding box associated with the object; and one or more memories coupled to the one or more processors and configured to provide the one or more processors with instructions.

10. The system of claim 9, wherein the initial object prediction information is generated by the machine learning (ML) model.

11. The system of claim 9, wherein the initial object prediction information further includes classification information associated with the plurality of objects in the image.

12. The system of claim 9, wherein the user interface is configured to, in response to a cursor being placed over or near a predicted bounding box or an object, provide an editing interface for the predicted bounding box.

13. The system of claim 9, wherein the user interface is configured to, in response to a cursor being placed over an object or a bounding box that is hidden, display the bounding box associated with the object.

14. The system of claim 9, wherein:

the user interface is configured to make bounding boxes of N objects closest to a cursor visible and hide remaining bounding boxes of other objects, wherein N is a prespecified natural number.

15. The system of claim 9, wherein:

the image and a hint associated with an object in the image are displayed; and the user interface is further configured to:

in response to the hint being selected, display a bounding box associated with the object and allow the user to make an adjustment to the bounding box; and in response to receiving the user input, update prediction information associated with the bounding box.

16. The system of claim 9, wherein:

the image and an initial hint associated with an object in the image are displayed; and the user interface is further configured to:

in response to the initial hint being selected, display a bounding box associated with the object and allow the user to make an adjustment to the bounding box;

in response to receiving the user input, update prediction information associated with the bounding box; and replace the bounding box with an updated hint that is distinct from the initial hint.

17. A computer program product for image annotation, the computer program product being embodied in a tangible non-transitory computer readable storage medium and comprising computer instructions for:

accessing initial object prediction information associated with an image, wherein the initial object prediction information includes a plurality of initial predictions associated with a plurality of objects in the image, including bounding box information associated with the plurality of objects;

presenting the image and at least a portion of the initial object prediction information to be displayed;

receiving adjusted object prediction information pertaining to at least some of the plurality of objects, wherein the adjusted object prediction information is obtained from a user input made via a user interface configured for a user to make annotation adjustments to at least some of the initial object prediction information, wherein the user interface is configured to allow the user to:

select a bounding box associated with an object and directly adjust the bounding box using the user interface; or change a type associated with the object using the user interface; and outputting updated object prediction information, wherein the updated object prediction information is based at least in part on the adjusted object prediction information; wherein:

the image and bounding boxes associated with a subset of objects in the image are displayed;

the subset of objects have corresponding confidence levels that at least meet a prespecified confidence level threshold;

a corresponding confidence level of an object in the subset of objects indicates how confident a machine learning model is in making a prediction associated with the object, the prediction including a bounding box of the object;

the image and a hint associated with an object in the image are displayed, the hint being a visual indication of an object that is more compact than a bounding box associated with the object; and the user interface is further configured to, in response to the hint being selected, display the bounding box associated with the object.

* * * * *